United States Patent
Farooqui et al.

(10) Patent No.: US 9,519,460 B1
(45) Date of Patent: Dec. 13, 2016

(54) UNIVERSAL SINGLE INSTRUCTION MULTIPLE DATA MULTIPLIER AND WIDE ACCUMULATOR UNIT

(71) Applicant: Cadence Design Systems, Inc., San Jose, CA (US)

(72) Inventors: Aamir A. Farooqui, Mountain View, CA (US); David Lawrence Heine, Mountain View, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 205 days.

(21) Appl. No.: 14/496,426

(22) Filed: Sep. 25, 2014

(51) Int. Cl.
*G06F 7/57* (2006.01)

(52) U.S. Cl.
CPC ...................... *G06F 7/57* (2013.01)

(58) Field of Classification Search
None
See application file for complete search history.

(56) References Cited

U.S. PATENT DOCUMENTS

| | | | |
|---|---|---|---|
| 4,807,175 A | 2/1989 | Tokumaru et al. | |
| 5,784,305 A * | 7/1998 | Nadehara | G06F 7/5443 708/523 |
| 5,896,543 A * | 4/1999 | Garde | G06F 9/30014 708/236 |
| 5,943,250 A * | 8/1999 | Kim | G06F 7/5338 708/625 |
| 6,301,599 B1 | 10/2001 | Chehrazi et al. | |
| 6,353,843 B1 | 3/2002 | Chehrazi et al. | |
| 6,611,856 B1 * | 8/2003 | Liao | G06F 7/5443 708/523 |
| 8,443,170 B2 | 5/2013 | Wilder et al. | |

(Continued)

OTHER PUBLICATIONS

Farooqui, "General Data-Path Organization of a MAC Unit for VLSI Implementation of DSP Processors", IEEE Xplore; Published in Circuits and Systems; 1998—ISCAS '98. Proceedings of the 1998 IEEE International Symposium on (vol. 2); May 31-Jun. 3, 1998; (4) pages.

(Continued)

*Primary Examiner* — David H Malzahn
(74) *Attorney, Agent, or Firm* — Andrews Kurth Kenyon LLP

(57) ABSTRACT

A single-instruction multiple-data (SIMD) multiplier-accumulator apparatus and method. A multiplier block with two 16-bit by 32-bit multiplier circuits transform a selectable number of input multipliers and multiplicands into a selected number of products. Each multiplier circuit comprises an array of full adders that generates and sums partial products using carry-save addition. An accumulator block, with additional data width to help prevent overflow, adds the products to a selectable number of input addends and outputs a number of results. Embodiments perform one to four multiplications together, depending on the number of bits (eight, 16, 24, or 32) selected for the input operands. Embodiments output 20-bit, 40-bit, or 80-bit multiply-accumulate results at rates of at least 1.1 GHz. Embodiments support signed inputs, negated multiplication products, and Q-format data. A hybrid sign extension management approach improves performance for 80-bit outputs.

20 Claims, 15 Drawing Sheets

(56) References Cited

U.S. PATENT DOCUMENTS

| | | | | |
|---|---|---|---|---|
| 2002/0002573 A1* | 1/2002 | Landers | ............... | G06F 7/49 |
| | | | | 708/501 |
| 2004/0230631 A1* | 11/2004 | Busaba | ............ | G06F 7/5324 |
| | | | | 708/620 |
| 2006/0004903 A1* | 1/2006 | Admon | ............ | G06F 7/5318 |
| | | | | 708/708 |
| 2013/0282783 A1 | 10/2013 | Li et al. | | |
| 2016/0140079 A1* | 5/2016 | Kravitz | ............ | G06F 15/8007 |
| | | | | 712/22 |

OTHER PUBLICATIONS

Anderson, "A 1.5 Ghz VLIW DSP CPU with Integrated Floating Point and Fixed Point Instructions in 40 nm CMOS", Published in Computer Arithmetic (ARITH), 2011 20th IEEE Symposium on Jul. 25-27, 2011; pp. 82-86.

Perri, "Fully-Synthesizable Reconfigurable Multiplier for High-Performance Multimedia Processors", Proceedings "GSP International Signal Processing Conference", Dallas, Texas, Mar. 31-Apr. 3, 2003; (5) pages.

\* cited by examiner

```
           1  1  0  1       (13) MULTIPLICAND M
           1  0  1  1       (11) MULTIPLIER Q
           ─────────────
           1  1  0  1
        1  1  0  1
     0  0  0  0                  PARTIAL PRODUCTS
  1  1  0  1
  ──────────────────
  1  0  0  0  1  1  1  1    (143) PRODUCT P
```

```
                            1   0   0   1   1   (-13)
   SIGN                     0   1   0   1   1   (+11)
   EXTENSION              _____
         1  1  1  1  1   1   0   0   1   1
         1  1  1  1  1   0   0   1   1
         0  0  0  0  0   0   0   0
         1  1  1  0  0   1   1
         0  0  0  0  0   0
                       _____
         1  1  0  1  1   1   0   0   0   1   (-143)
```

ARRAY IMPLEMENTATION

TYPICAL CELL

TRUTH TABLE FOR SIGN EXTENSION BIT (SE) GENERATION:

$a_{i+1}$ = MSB OF 3-BIT MULTIPLIER FOR BOOTH ENCODER

Bs = SIGN BIT OF MULTIPLICAND

Ub = SIGNED / UNSIGNED CONTROL SIGNAL

| $a_{i+1}$ | Bs | Ub | SE |
|---|---|---|---|
| 0 | 0 | 0 | 1 |
| 0 | 0 | 1 | 1 |
| 0 | 1 | 0 | 0 |
| 0 | 1 | 1 | 1 |
| 1 | 0 | 0 | 0 |
| 1 | 0 | 1 | 0 |
| 1 | 1 | 0 | 1 |
| 1 | 1 | 1 | 0 | se_32 = ((a[31] & b[31] & se[15] & unsign_a & unsign_b) |
    (!a[31] & !b[31] & !se[15]) |
    ( a[31] & !b[31] & unsign_a & unsign_b))

UNIVERSAL SINGLE INSTRUCTION MULTIPLE DATA MULTIPLIER AND WIDE ACCUMULATOR UNIT

FIELD OF THE DISCLOSURE

This description relates to the field of hardware-based binary multipliers, and more precisely to a single-instruction multiple-data (SIMD) multiplier-accumulator unit.

BACKGROUND

Single-instruction multiple-data systems process multiple digital data streams by executing a particular operation in parallel for each data stream. One commonly used example is the multiply-accumulate operation, which computes the product of two numbers inputted in a given format and adds that product to an accumulator. An addend may also be specifically provided as an input. Thus, the multiply-accumulate operation may generally evaluate the expression: (A*B)+C.

A group of multiply-accumulate operations may be applied concurrently to a vector of inputs representing a set of data streams, resulting in a vector of outputs. Thus, in a conventional C-language representation, such a group of multiply-accumulate operations may be described as:

for (int i=0; i<16; i++)
{
  result.val[i]=a.val[i]*b.val[i]+c.val[i];
}

Multiplications may be understood simply as a set of repeated additions that may be performed by any general-purpose processor, but in practice this multiplication design approach can be quite time-consuming. Many computing situations require high throughput multiply-accumulate operations, so these operations are often performed by dedicated hardware instead of regular processors. Hardware designers must not only minimize power consumption and integrated circuit area, but balance the use of dedicated hardware against the workload removed from regular processors.

Multiply-accumulate operations are often needed where incoming data sets are of variable precision, and may be signed (e.g., positive or negative in value). For example, nearly every digital signal processor uses digital hardware multipliers, for demanding multimedia applications like desktop video conferencing, which requires audio/image/video processing perhaps including 3-D graphics, speech recognition, and wireless communications. Multiply-accumulator units must therefore be configurable to handle the variety of incoming data formats (e.g., 8-bit bytes, 16-bit integers, 24-bit words, and 32-bit doubles) used in each aspect of the overall computing task. This universality or reconfigurability constraint complicates the hardware design problem.

Further, because multiply-accumulate operations may be repeated many times during the processing of a given data stream, accumulator overflow is not uncommon. The provision of increased accumulator data width to avoid overflow unfortunately usually requires extra hardware and delay.

Accordingly, the inventors have developed a novel apparatus and method for flexibly performing multiply-accumulate operations for incoming operands provided in a variety of formats, at high speed, and with low power consumption.

BRIEF DESCRIPTION OF THE DRAWINGS

FIG. 9 is a diagram of a sign extension truth table, according to an embodiment.

DETAILED DESCRIPTION

This description presents a new SIMD digital hardware multiplier-accumulator apparatus, and related design approach and operating method. A multiplier block with two 16-bit by 32-bit multiplier circuits may transform a selectable number of input multipliers and multiplicands into a selected number of products. Each multiplier circuit may comprise an array of full adders that generates and sums partial products using carry-save addition. An accumulator block, with additional data width to help prevent overflow, may add the products to a selectable number of input addends and output a number of results. The accumulator block may comprise a 3:2 Wallace tree compressor together with a 5:2 Wallace tree compressor, feeding a carry propagate adder together with a 2× carry propagate adder, feeding a multiplexed three-input carry propagate adder.

An input two-bit format control signal may designate a number of bits, e.g., eight, 16, 24, or 32, for the input multipliers, multiplicands, and addends (more generally, "operands"). The input two-bit format control signal may also designate the overall number of concurrent multiplications performed by the multiplier circuits and the accumulator width for each multiplication product. Embodiments may perform four eight-bit by eight-bit concurrent operations, two 16-bit by 16-bit concurrent operations, or one 24-bit by 24-bit or one 32-bit by 32-bit operation. Embodiments may output 20-bit results for eight-bit by eight-bit operations, 40-bit results for 16-bit by 16-bit operations, or 80-bit results for 24-bit by 24-bit and 32-bit by 32-bit operations, at effective output rates of at least 1.1 GHz.

Embodiments may support simultaneous signed/unsigned inputs, negated multiplication products, and Q-format data, via various control signals. Special logic circuitry may handle sign extension for 80-bit outputs by evaluating a predetermined sign extension expression.

Figure 1:
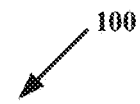
FIG. 1 is a diagram of a manual unsigned multiplication algorithm, according to an embodiment.

FIG. 1 shows a manual unsigned multiplication algorithm 100, according to an embodiment. Generally, multiplicand M is multiplied by multiplier Q to yield product P. This algorithm is depicted to show its similarity to conventional long multiplication on decimal integers, in which each partial product is determined by multiplying a particular digit of the multiplicand by the multiplier. Each partial product is shifted left an appropriate number of positions corresponding to which digit of the multiplier is used in the multiplication. The partial products are then added together.

With binary multiplication, each partial product is either a zero or a copy of the multiplicand, so unlike multiplication on decimal integers no multiplication table need be memorized. However, for large binary numbers a large number of additions are required, which can be slow. Further, if one of the numbers being multiplied is negative, handling the sign properly can complicate matters.

Figure 2:
FIG. 2 is a diagram of a manual signed multiplication algorithm using two's complement notation, according to an embodiment.

FIG. 2 shows a manual signed multiplication algorithm 200 using two's complement notation, according to an embodiment. The two's complement of an N-bit number is defined as the result of subtracting the number from $2^N$, which in binary is just one followed by N zeroes. In this representation, which is the most common method of representing signed integers on computers, a negative number is represented by the two's complement of its absolute value. The sign of the number is therefore effectively embedded in the number itself, which complicates the multiplication process.

When one of the input operands is signed versus unsigned, the partial products need to be sign-extended up to the width of the product before they are summed. The sign extension bits are shown in the dashed region of FIG. 2. Even for four-bit operands, the sign extension bit count is comparable in size to the bit count of the unsigned partial products. Sign extension bit management becomes an important issue for multiplier designs capable of handling large operands.

Figure 3:
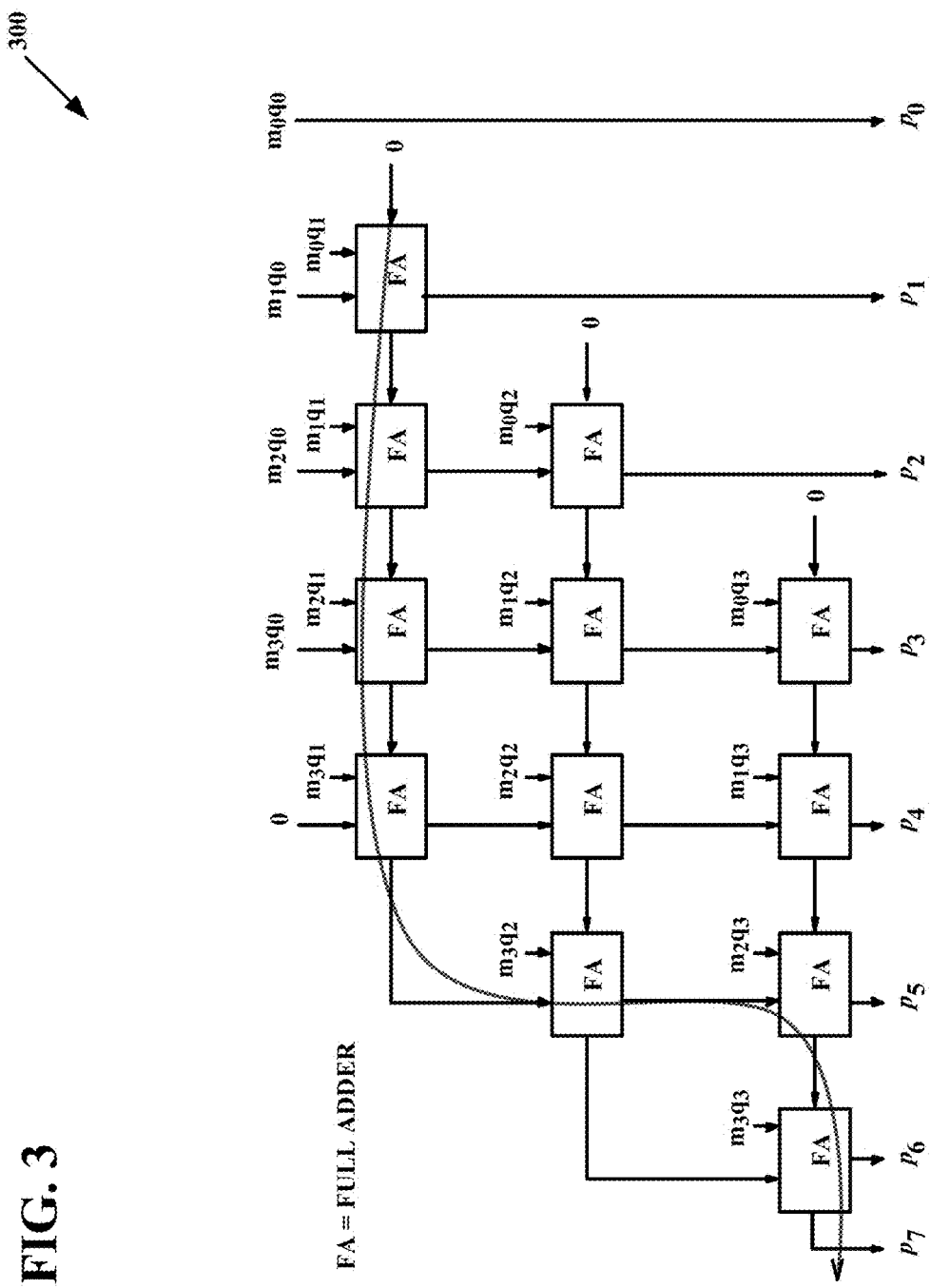
FIG. 3 is a diagram of a multiplier block comprising an array of full adders showing addition of summands, according to an embodiment.

FIG. 3 shows a multiplier block 300 comprising an array of full adders showing addition of summands, according to an embodiment. A full adder adds two input binary numbers and also accounts for values carried in from the next less significant stage. The outputs of each full adder are a sum bit and a carry-out bit. A full adder may be implemented in many different ways, as is known in the art.

FIG. 3 is a direct hardware implementation of the addition process shown in FIG. 1, with multiplicand M comprising bits m3, m2, m1, and m0 from most significant to least significant, and multiplier Q comprising bits q3, q2, q1, and q0 again from most significant to least significant. The first partial product is represented by the terms 0, m3q0, m2q0, m1q0, m0q0. The first partial product is added to the second partial product represented by the terms m3q1, m2q1, m1q1, m0q1, 0, where the 0 in the least significant bit position denotes the left-shifting of the second partial product.

The carry-out result of the addition may flow from right to left as shown by the darker overlaid path of FIG. 3, and may be propagated or rippled into the left-most full adder used to perform the addition of the third partial product. The bits p0-p7 of the product may be generated in turn, from least significant to most significant. While the carry-propa- gate adder may be simple to lay out, it is relatively slow because each full adder must wait for the carry bit to be calculated from the previous full adder. For multipliers that handle larger operands, a faster arrangement may be needed.

Figure 4:
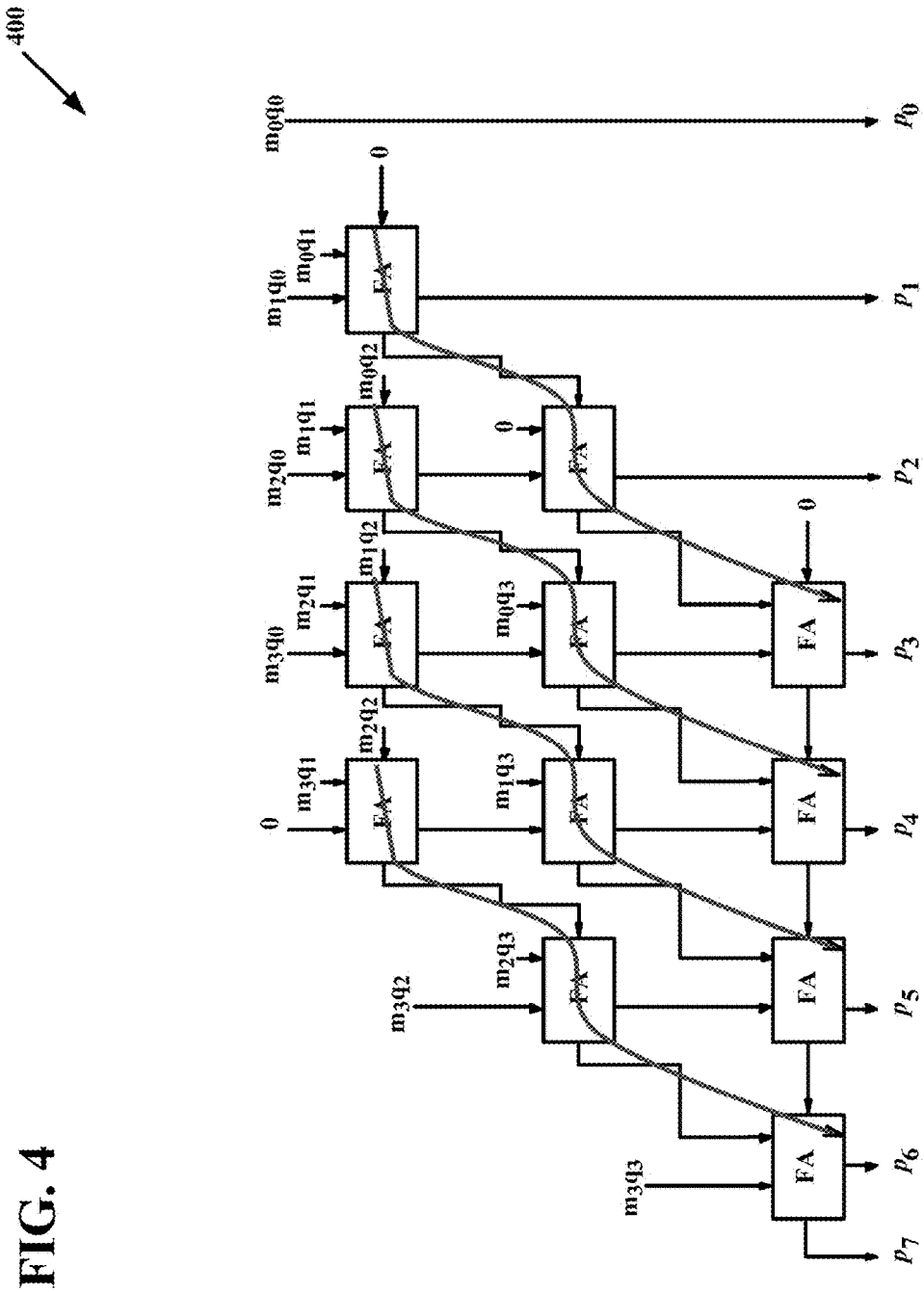
FIG. 4 is a diagram of a multiplier block comprising an array of full adders showing carry-save addition of summands, according to an embodiment.

FIG. 4 shows a multiplier block 400 comprising an array of full adders showing carry-save addition of summands, according to an embodiment. Carry-save adders distribute the cost of carrying n bits over n operations, as carries run along with individual results. If an adding circuit is to compute the sum of three or more numbers, it can be advantageous to not propagate the carry result. Instead, three input adders may be used, generating two results: a sum and a carry. The sum and the carry may be fed into two inputs of the subsequent 3-number adder without having to wait for propagation of a carry signal. After all stages of addition are performed, a conventional adder may combine the final sum and carry results.

In FIG. 4, the first and second partial products are added, but the bits of the third partial product are submitted as carry-in bits. The resulting carry-out bits are fed into the next row of adders that computes the fourth partial product, as shown by the darker overlaid paths of FIG. 4. Carry-save addition may be particularly useful with multiplier schemes that reduce the number of overall partial products, such as those using conventional Booth encoders. Outputs may be produced in carry-save form by a multiplier block and finally added in an accumulator block of a multiply-accumulate unit.

Figure 5:
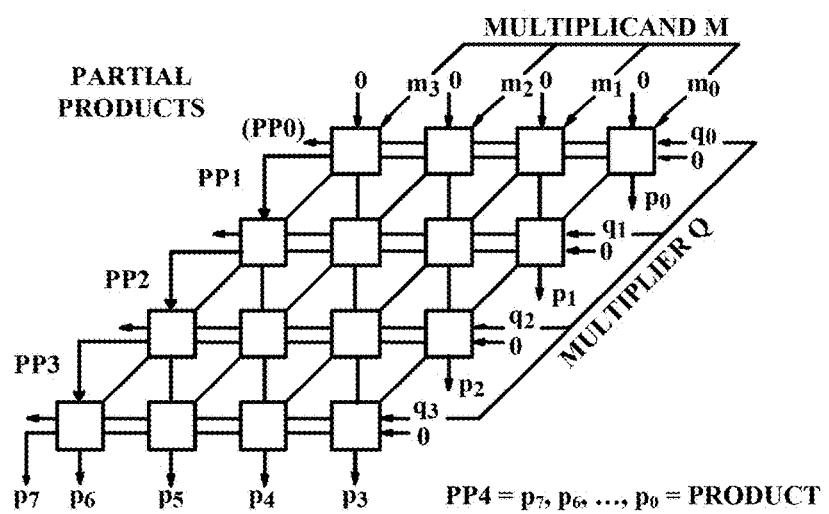
FIG. 5 is a diagram of a 4-bit portion of a multiplier block implementation depicting partial products and individual array cells, according to an embodiment.
Figure 5:
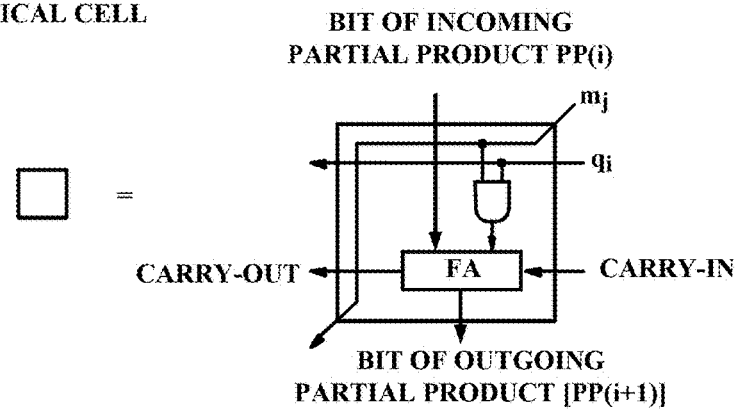

FIG. 5 shows a 4-bit portion of a multiplier block implementation 500 depicting partial products and individual array cells, according to an embodiment. Multiplicand M and multiplier Q are shown in diagonal row-column format in order of increasing bit significance. Partial products PP0-PP3 are generated by each adder row in turn, while partial product PP4 represents the final output, in this example comprising product bits p7-p0. Each cell of the array may receive a bit of an incoming partial product, a corresponding bit of the multiplier, a carry-in bit, and a bit of the multiplicand according to its column position. Each cell may output a carry-out bit and a bit of the next partial product.

Figure 6:
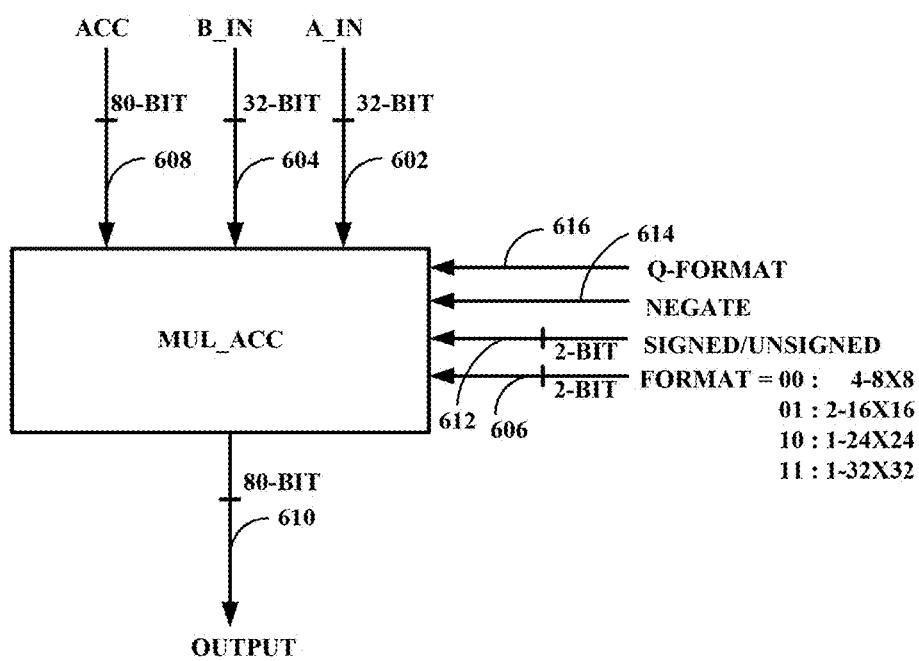
FIG. 6 is a diagram of a multiplier-accumulator interface including control signals, according to an embodiment.

FIG. 6 shows a multiplier-accumulator 600 interface including control signals, according to an embodiment. Two input operands A_IN 602 and B_IN 604 are denoted as 32-bit numbers; each may comprise a single 32-bit or 24-bit number, a pair of 16-bit numbers, or four 8-bit numbers. Assignment of particular input operands to multiplier and multiplicand roles may vary according to particular implementations. A two-bit data format control signal 606 may designate the number of bits for the input operands, which may also designate the number of multiply-accumulate operations that will be performed. The multiplier-accumulator may perform a single 32-bit by 32-bit multiplication, a single 24-bit by 24-bit multiplication, two 16-bit by 16-bit multiplications, or four 8-bit by 8-bit multiplications.

Addend input ACC 608 is denoted as an 80-bit number representing one or more addends to be added to the multiplication product(s). The two-bit data format control signal 606 may also designate whether the addend input represents a single 80-bit number (for 24-bit and 32-bit operands), two 40-bit numbers (for 16-bit operands), or four 20-bit numbers (for 8-bit operands). The two-bit data format control signal 606 may also similarly designate the output 610 format. The extra accumulator width may help prevent overflow from occurring following a number of multiply-accumulate operations.

A two-bit signed multiplication control signal 612 may designate how the input multiplier(s) and the input multiplicand(s) are signed. One bit of control signal 612 may for example designate whether A_IN 602 represents a signed operand (or operands), while the other bit of control signal 612 may designate whether B_IN 604 represents a signed operand (or operands). An input negation control signal 614 may designate whether the multiplication product(s) are to be negated prior to addition to the addend.

An input Q-format control signal 616 may designate whether the input addend, multiplier, and multiplicand values are formatted in Q-format. Q-format numbers are fixed point numbers stored and operated on as regular binary numbers (signed integers), allowing standard integer hardware to perform rational number calculations. The number of integer bits, fractional bits, and the underlying word size are dependent upon user selection and management.

Figure 7:
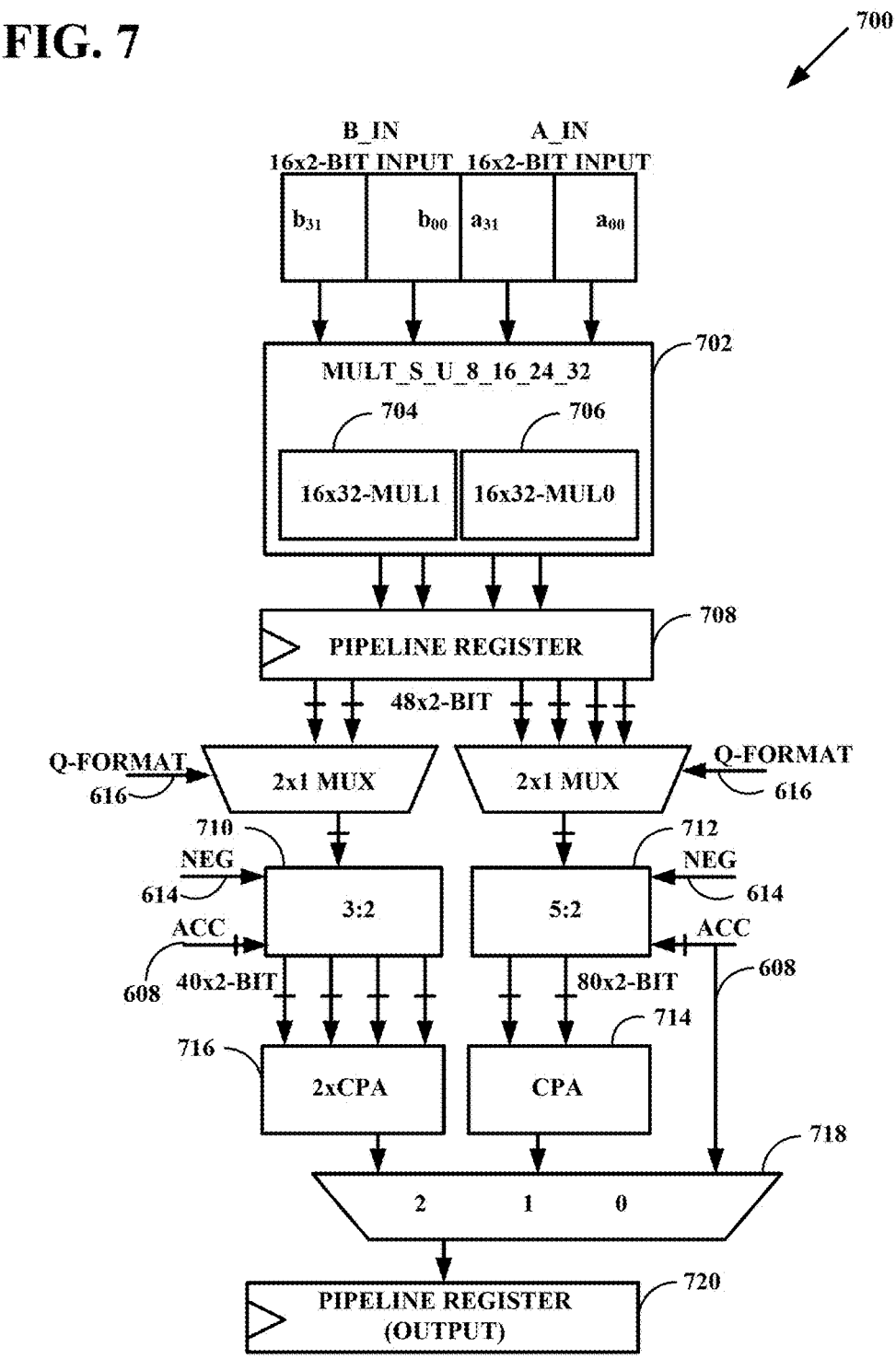
FIG. 7 is a block diagram of a multiplier-accumulator apparatus, according to an embodiment.

FIG. 7 shows a block diagram of a multiplier-accumulator apparatus 700, according to an embodiment. Input operands A_IN 602 and B_IN 604 are provided as 16×2-bit inputs, meaning that while each operand may comprise either a single 32-bit number, a single 24-bit number, two 16-bit numbers, or four 8-bit numbers, the operands are fed into multiplier block 702 as a pair of 16-bit numbers. Multiplier block 702 may comprise two 16-bit by 32-bit multiplier circuits 704 and 706. The multiplier circuits may together transform a number of input multipliers and a number of input multiplicands into a number of multiplication products. Each multiplier circuit may comprise an array of full adders that generates and sums partial products using carry-save addition. The number of partial products may be reduced using conventional Booth encoders. The multiplication products may be loaded into a first pipeline register 708 in carry-save format.

The decision to use two 16-bit by 32-bit multipliers is the result of a design approach that considers not only the area, delay, and power consumption of the multiplier-accumulator apparatus IC implementation, but also data partitioning and sign extension issues. For example, the use of 16 8-bit by 8-bit multipliers provides flexibility for complex multiplication, but leads to large area and delay, and complex sign extension management. A design with four 16-bit by 16-bit multipliers requires partitioning for 8-bit adders and may lead to larger area than other design options. A single 32-bit by 32-bit multiplier offers the lowest area, but is hard to partition. A design with two 16-bit by 32-bit multipliers requires minimum partitioning logic and offers nearly optimal area.

The rest of the multiplier-accumulator apparatus 700 may comprise an accumulator block that adds the multiplication products to a number of input addends and tangibly outputs a number of multiply-accumulate results. The accumulator block may comprise a 3:2 compressor 710 and a 5:2 compressor 712 working together to format multiplication products, a carry propagate adder 714 and a 2× carry propagate adder 716 working together, and a multiplexed partitionable three-input carry propagate adder 718. The multiply-accumulate output 610 may be written to a second pipeline register 720. An exemplary IC implementation of the multiplier-accumulator apparatus may output multiply-accumulate results at a rate exceeding 1.1 GHz.

Figure 8:
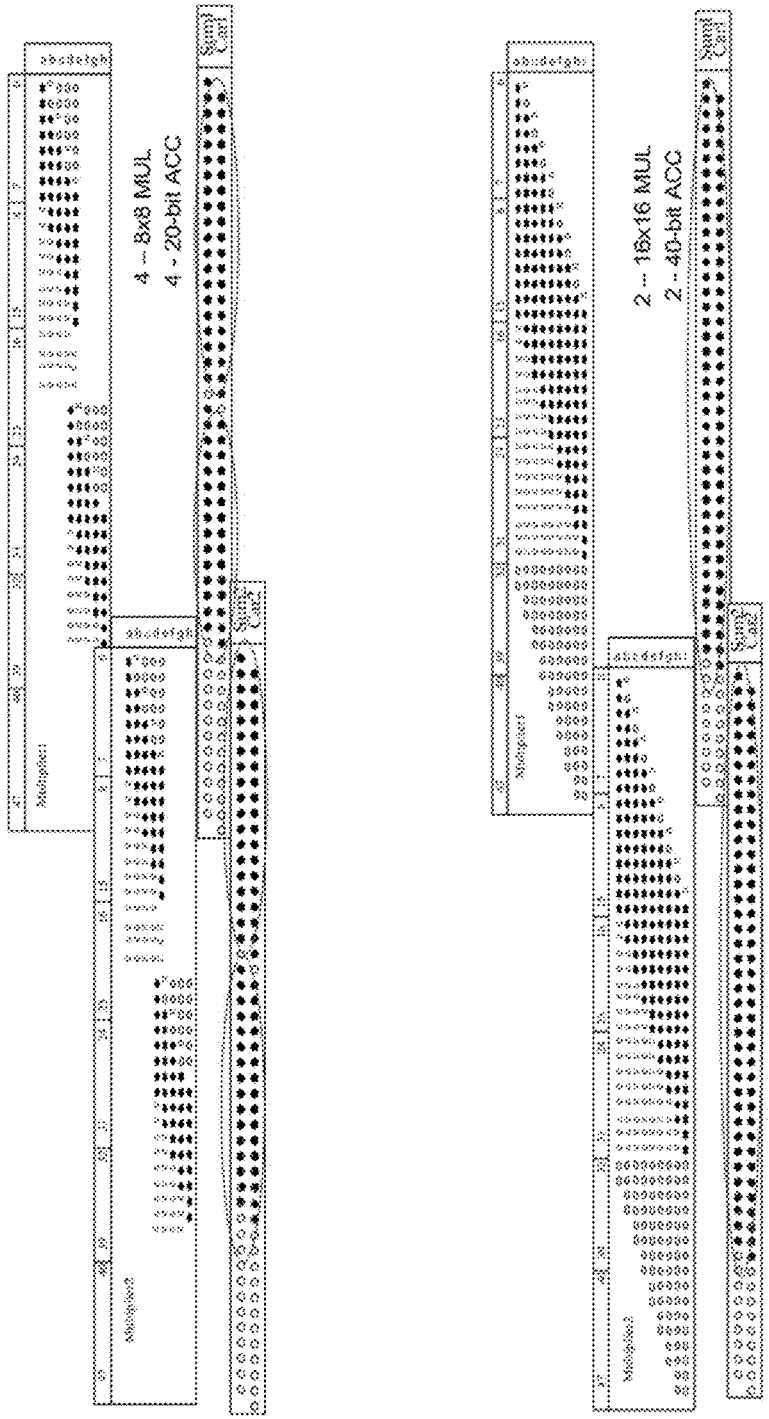
FIG. 8 is a diagram of configurable partial product and output formats for a SIMD multiplier-accumulator apparatus with two 16-bit by 32-bit multiplier blocks, according to an embodiment.

FIG. 8 shows configurable partial product and output formats 800 for a SIMD multiplier-accumulator apparatus with two 16-bit by 32-bit multiplier blocks, according to an embodiment. For the four 8-bit by 8-bit multiplications, four 20-bit multiply-accumulate results (shown encircled) may be generated in carry-save format. For the two 16-bit by 16-bit multiplications, two 40-bit multiply-accumulate results (shown encircled) may be generated in carry-save format. For the single 24-bit by 24-bit multiplication and the single 32-bit by 32-bit multiplication, a different scheme may be used, due to sign extension cost considerations.

FIG. 9 shows a sign extension truth table 900, according to an embodiment. For a 32-bit by 32-bit multiplication, sign extension of a 32-bit number to 64 bits (or 80 bits for ACC) is required. A conventional sign extension implementation would increase the required hardware for implementation by approximately 25 percent, and also increase the delay and power consumption considerably. A different scheme may avoid this conventional sign extension cost problem for 24-bit and 32-bit operands.

One embodiment employs a hybrid sign extension management approach. The embodiment may perform sign extension of 8-bit and 16-bit operands conventionally as previously described. The different scheme used by this embodiment for sign extension of the larger (24-bit and 32-bit) operands is described for a 16-bit by 16-bit multiplier in the reference "General Data-path Organization of a MAC Unit for VLSI Implementation of DSP Processors" by A. A. Farooqui and V. G. Oklobdzija published in volume 2, pages 260-263, of the IEEE International Symposium on Circuits and Systems (ISCAS '98), Monterey, Calif., May 31-Jun. 3, 1998, which is hereby incorporated by reference in its entirety. This scheme may be adapted for use in both the 16-bit by 32-bit multiplier circuits and the accumulator block in the embodiment.

As explained in the incorporated reference, when adding partial products using carry-save adders, each partial product must be sign extended to the m+n binary position. The addition of these extended signs becomes very costly. Therefore, a different scheme may assume that all partial products are negative. The sum of all the sign extensions may thus be pre-calculated as a constant number equal to 101010 . . . 01011. If it turns out that a partial product is positive, then a one may be added to undo the effect of the earlier assumption.

The constant number may be added to the unextended partial products, starting from the n+1 binary position. A sign extension control bit (SE) may be attached to each partial product at bit position n+2 to deal with a partial product. If it turns out that a partial product is positive, then the sign extension control bit (SE) equals one.

If this process is applied, the number operands to be added together increases. The number of operands may be reduced by one by combining the last three bits (011) of the constant 101010 . . . 01011 with the first partial product, and all the others with the rest of the partial products. In the first partial product, a multiplexer controlled by sign extension control bit SE may select 011 when SE is zero (and may select 100 when SE is one). The sign extension control bit SE is dependent on the value of the sign bit of the multiplicand (Bs), the control signal denoting whether the multiplicand is signed (Ub, which is zero if the multiplicand is signed and one if it is unsigned), and the most significant bit $a_{i+1}$ of the 3-bit multiplier used for the Booth encoder.

Figure 10:
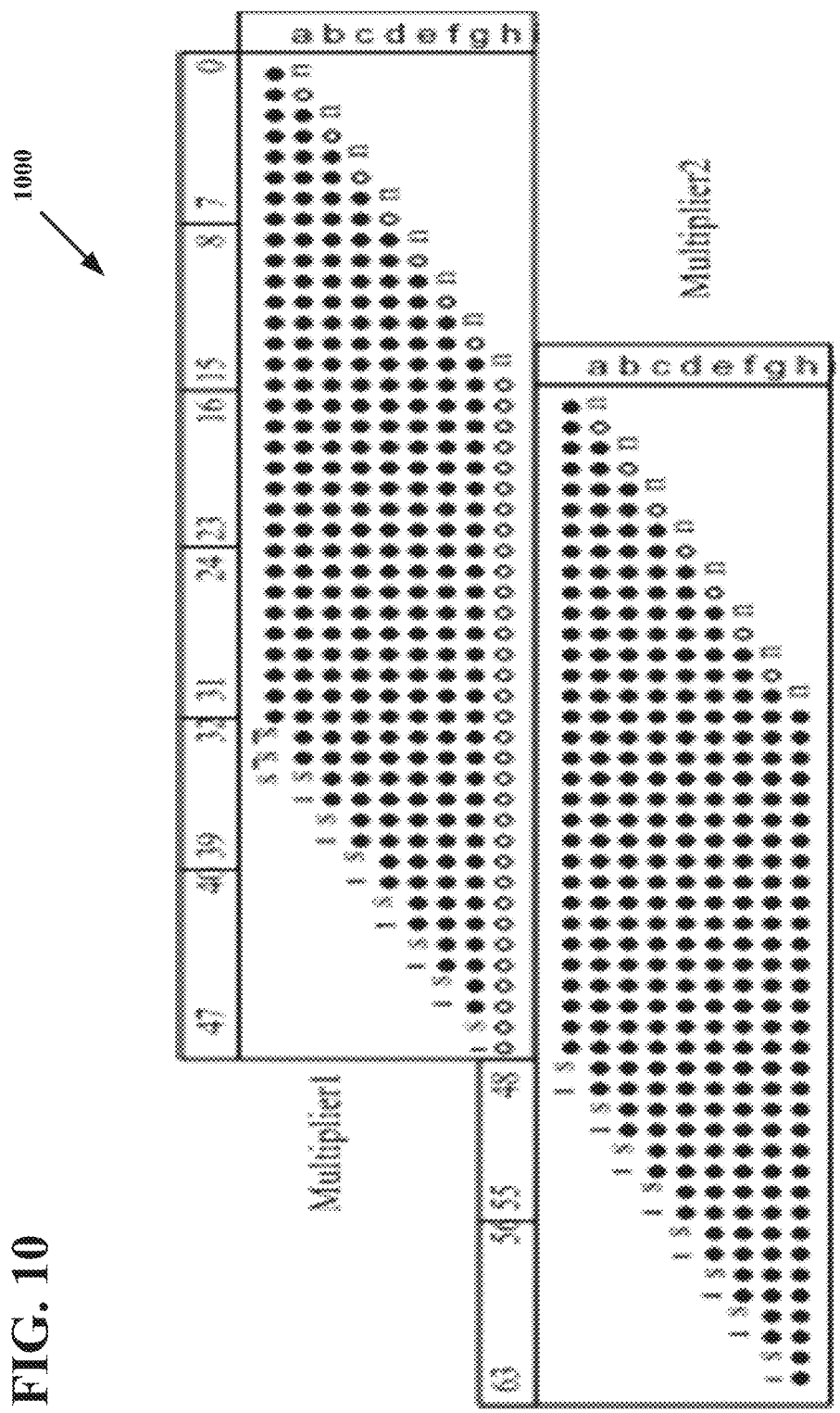
FIG. 10 is a diagram of partial products and sign extensions for 16-bit by 32-bit multiplications, according to an embodiment.
Figure 11:
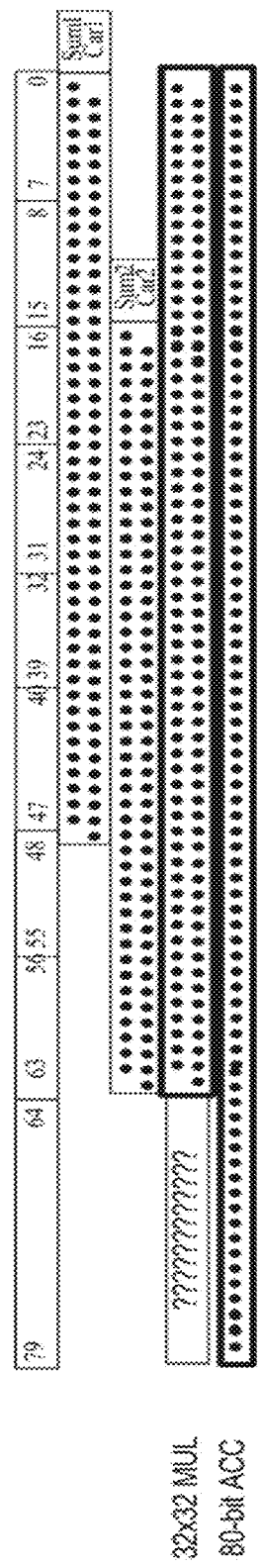
FIG. 11 is a diagram of an output format for 32-bit by 32-bit multiplications in an 80-bit accumulator, according to an embodiment.

FIG. 10 shows partial products and sign extensions 1000 for 16-bit by 32-bit multiplications, according to an embodiment. FIG. 11 shows an output format 1100 for 32-bit by 32-bit multiplications in an 80-bit accumulator, according to an embodiment. The output sign extension bits (denoted by question marks) may be provided by combinational logic that evaluates a predetermined sign extension expression for the leading bits of the 80-bit multiply-accumulate result.

Figure 12:
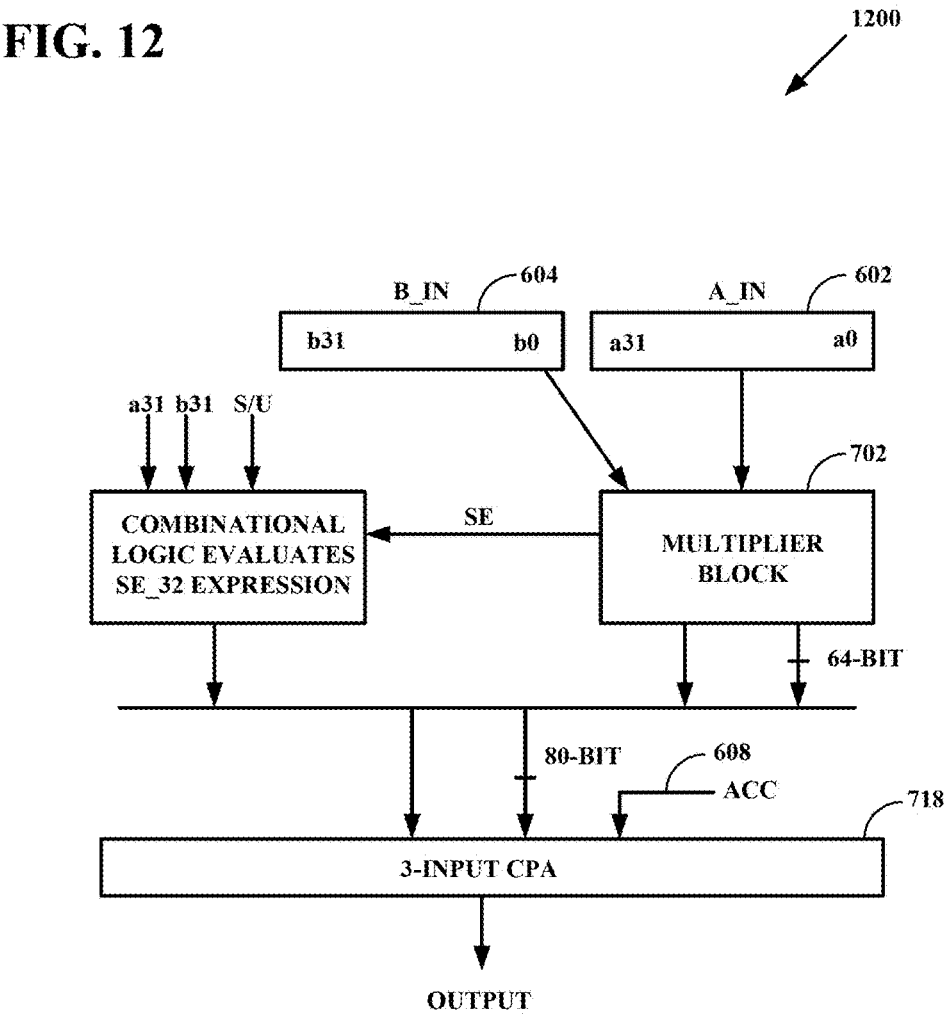
FIG. 12 is a diagram of a sign extension evaluation apparatus for 32-bit by 32-bit multiplications in an 80-bit accumulator, according to an embodiment.

FIG. 12 shows a sign extension evaluation apparatus for 32-bit by 32-bit multiplications in an 80-bit accumulator, according to an embodiment. The sign extension control bit SE, may be computed for partial products generated by multiplier block 702 according to the table of FIG. 9. Combinational logic, comprising a three-input OR gate and a number of AND gates and inverters for example, may evaluate the se_32 expression shown to generate the sign extension bits for the 80-bit accumulator. The se_32 expression may be evaluated before addition of the partial products.

Figure 13:
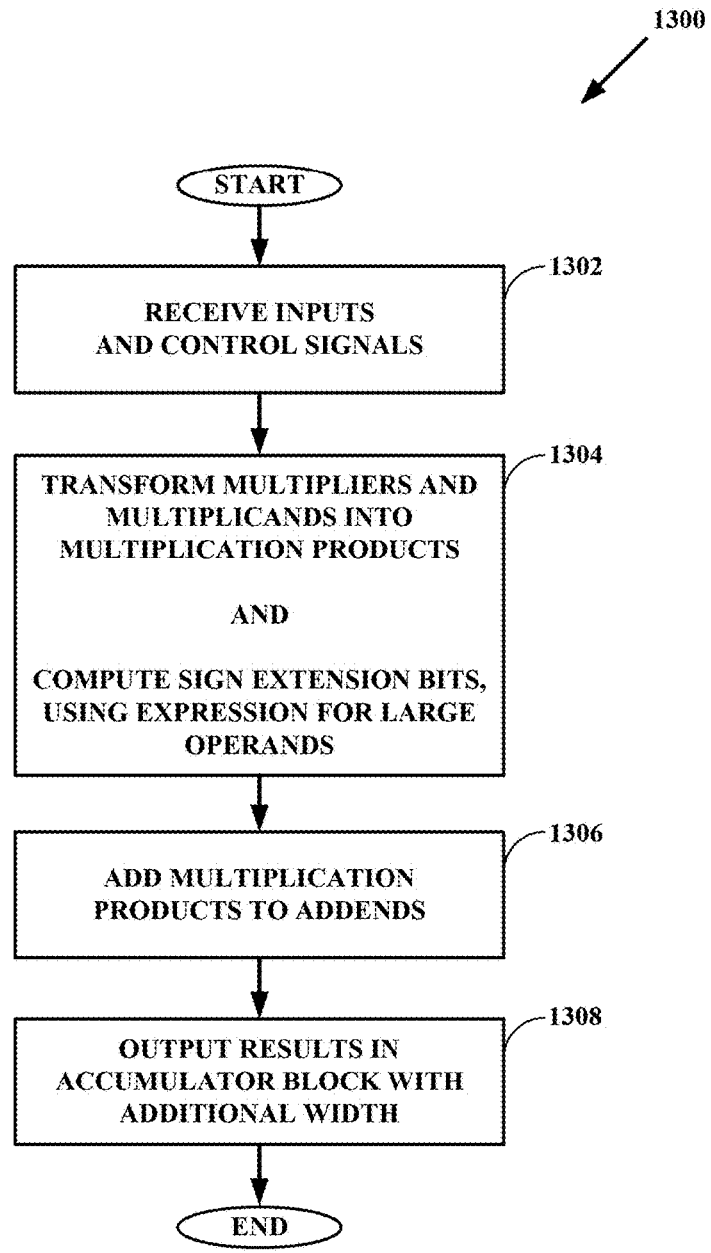
FIG. 13 is a flowchart of a multiply-accumulate computational method, according to an embodiment.

FIG. 13 shows a multiply-accumulate computational method, according to an embodiment. The method may perform single-instruction multiple-data operations on a number of input multiplicands, multipliers, and addends, as may be controlled by a number of input control signals as shown at 1302. The control signals may include a two-bit data format control signal to designate a number of bits for the input multipliers and the input multiplicands, e.g. eight, 16, 24, or 32. The data format control signal may also designate an overall number of multiplications performed, and the accumulator width for each multiplication product. For example, the method may perform four eight-bit by eight-bit multiplications each with a 20-bit accumulator width, or two 16-bit by 16-bit multiplications each with a 40-bit accumulator width, one 24-bit by 24-bit or one 32-bit by 32-bit multiplication each with an 80-bit accumulator width.

A two-bit signed multiplication control signal may be inputted to designate how the input multipliers and the input multiplicands are selectively signed. A negation control signal may be inputted to designate whether the multiplication products are to be selectively negated. A Q-format control signal may be inputted to designate whether the input addend, multiplier, and multiplicand values are selectively formatted in Q-format.

At 1304, the method may transform the multipliers and multiplicands into a number of multiplication products. In one embodiment, the method may perform two concurrent 16-bit by 32-bit multiplications. Each multiplication may comprise generating and summing partial products using carry-save addition. The method may employ two multiplier circuits, with each comprising an array of full adders.

Also at 1304, and in parallel with the computation of multiplication products, the method may compute sign extension bits using a hybrid approach. For 8-bit and 16-bit operands, the method may compute the sign extension bits conventionally. For 24-bit and 32-bit operands however, the method may employ a different scheme that is less computationally expensive, which may comprise evaluating a predetermined sign extension expression for example with combinational logic.

At 1306, the method may add the multiplication products to a number of input addends. The method may employ an accumulator block that compresses the multiplier products with a 3:2 compressor and a 5:2 compressor acting together. The method may combine the compressed results, for example using a carry propagate adder and 2× carry propagate adder together. The method may sum the intermediate results with a three-input carry propagate adder. In another embodiment, two separate 80-bit inputs may be added or subtracted using the 80-bit carry propagate adder, to save area in the arithmetic logic unit (ALU).

At 1308, the method may tangibly output the multiply-accumulate results in an accumulator block. The output may comprise wordlengths of lengths exceeding the minimum widths required, to avoid the overflow condition that could occur following a number of repeated multiply-accumulate operations. The method may be performed by a processor that executes instructions stored in a non-transitory computer readable medium.

Figure 14:
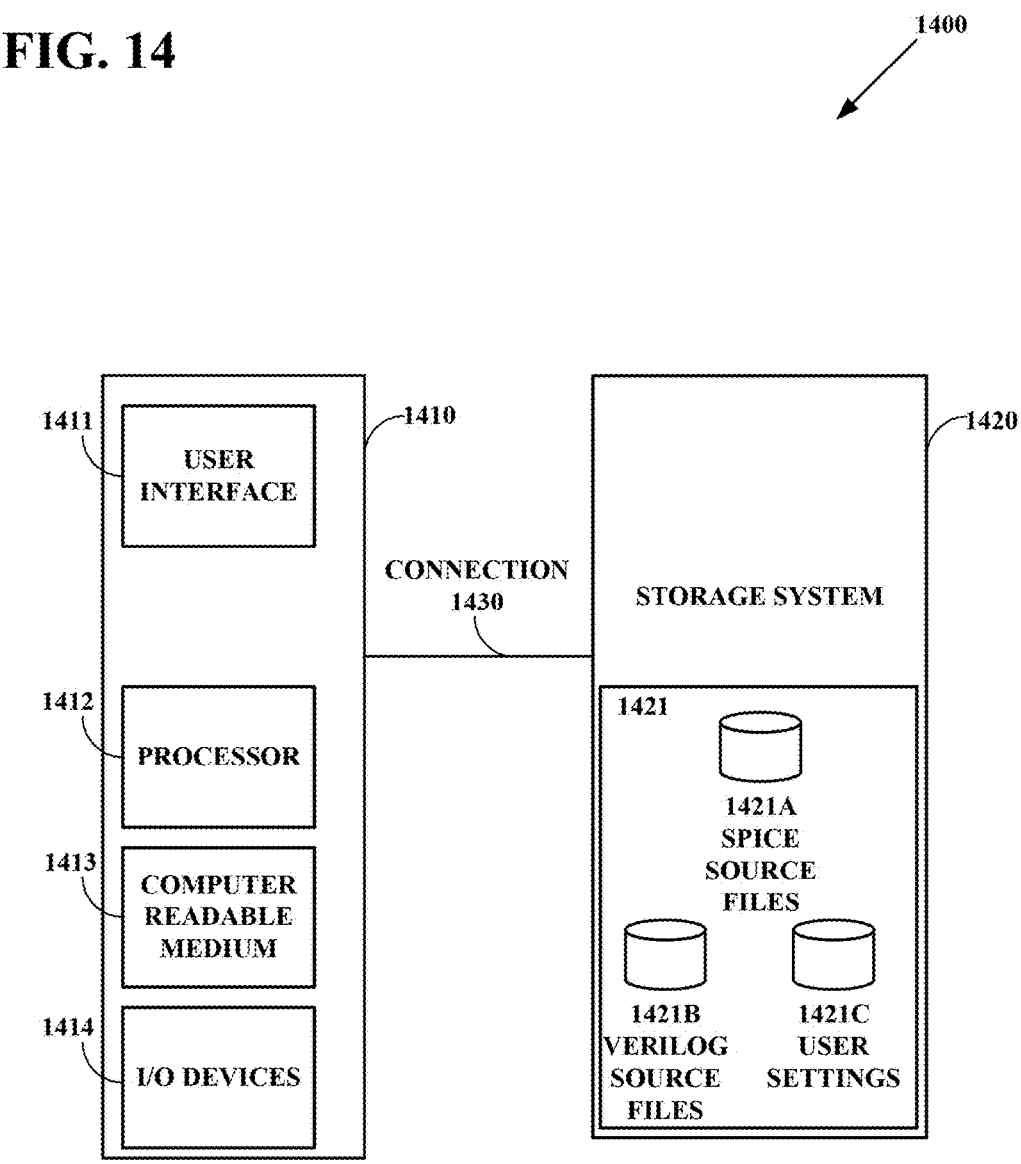
FIG. 14 is a block diagram of a circuit analysis system, according to an embodiment.

FIG. 14 shows an exemplary circuit analysis system 1400, according to an embodiment. This system may provide simulator functionality for any apparatus and method described above, including for example expansion of an implementation described in Verilog or other hardware design languages into a complete integrated circuit design. A user may access the system 1400 through a standalone client system, client-server environment, or a network environment. System 1400 may comprise one or more clients or servers 1410, one or more storage systems 1420, and a connection or connections 1430 between and among these elements.

Client 1410 may execute instructions stored on transitory or non-transitory computer readable medium 1413 with processor 1412, and may provide a user interface 1411 to allow a user to access storage system 1420. The instructions may be part of a software program or executable file that may operate electronic design automation (EDA) software. Client 1410 may be any computing system, such as a personal computer, workstation, mobile computer, or other device employing a processor which is able to execute programming instructions. User interface 1411 may be a GUI run in a user-controlled application window on a display. A user may interact with user interface 1411 through one or more input/output (I/O) devices 1414 such as a keyboard, a mouse, or a touch screen.

Storage system 1420 may take any number of forms, including but not limited to a server with one or more storage devices attached to it, a storage area network, or one or a plurality of non-transitory computer readable media. Databases 1421 may be stored in storage system 1420 such that they may be persistent, retrieved, or edited by the user. Databases 1421 may include SPICE source files 1421A, Verilog source files 1421B, and a user input database 1421C for example. These databases may be kept as separate files or systems, or may be merged together in any appropriate combination.

Only one client 1410 is shown connected to storage system 1420 through connection 1430, which may be a simple direct wired or wireless connection, a system bus, a network connection, or the like, to provide client 1410 with access to storage system 1420. In another aspect, connection 1430 may enable multiple clients 1410 to connect to storage system 1420. The connection may be part of a local area network, a wide area network, or another type of network, again providing one or more clients with access to storage system 1420. Depending on system administrator settings, client 1410's access to system storage 1420 or to other clients may be limited.

Figure 15:
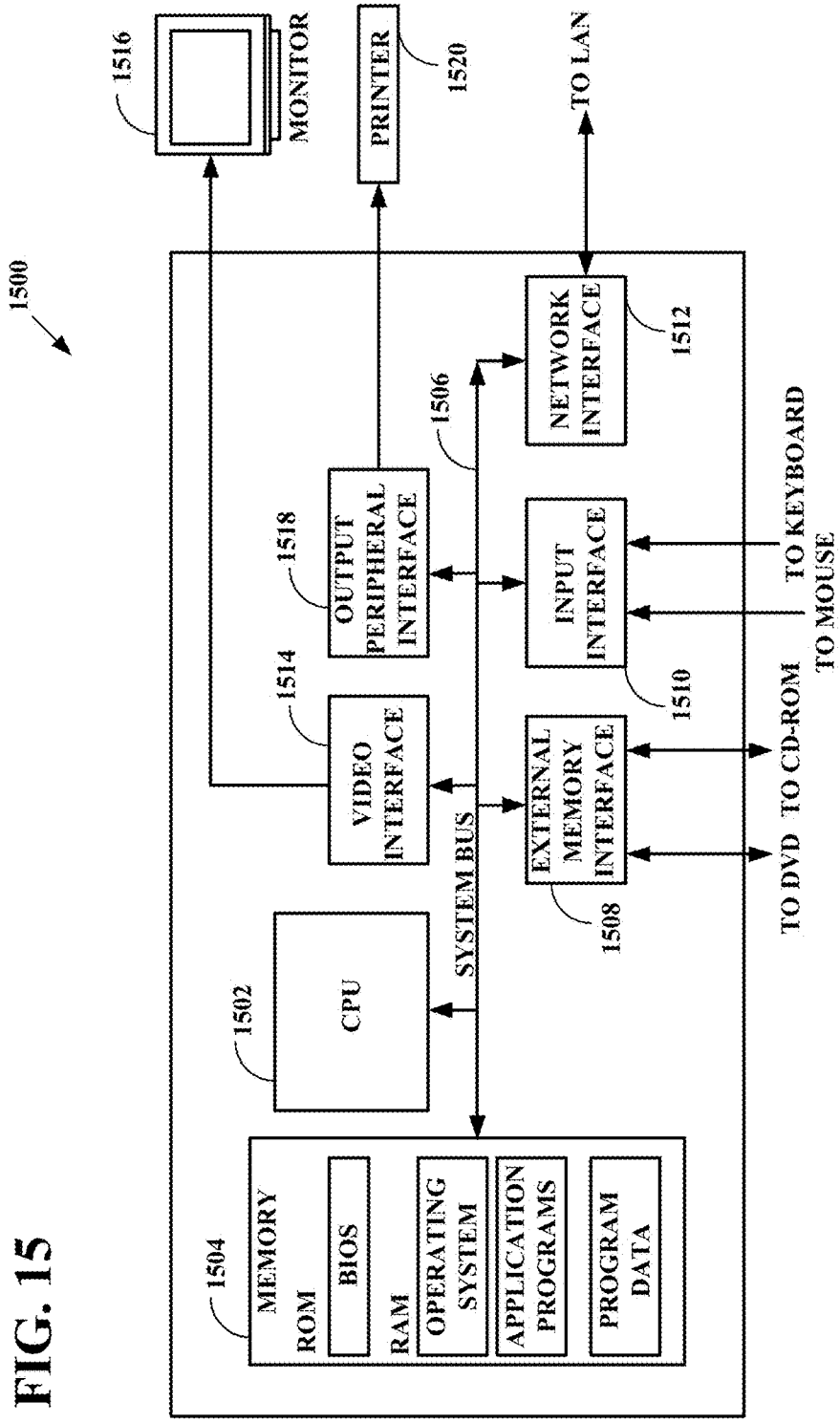
FIG. 15 is a diagram of a computer system, according to an embodiment.

FIG. 15 shows a computer system comprising the structure for implementation of the embodiments described above. Computer system 1500 comprises a central processing unit (CPU) 1502 that processes data stored in memory 1504 exchanged via system bus 1506. Memory 1504 typically includes read-only memory, such as a built-in operating system, and random-access memory, which may include an operating system, application programs, and program data. Computer system 1500 also comprises an external memory interface 1508 to exchange data with a DVD or CD-ROM for example. Further, input interface 1510 may serve to receive input from user input devices including but not limited to a keyboard and a mouse. Network interface 1512 may allow external data exchange with a local area network (LAN) or other network, including the internet. Computer system 1500 also typically comprises a video interface 1514 for displaying information to a user via a monitor 1516. An output peripheral interface 1518 may output computational results and other information to output devices including but not limited to a printer 1520.

Computer system 1500 may comprise for example a personal computer or an engineering workstation, each of which is widely known in the art and is commonly used for integrated circuit design tasks, along with software products commercially available for performing computer-aided integrated circuit design tasks. Computer system 1500 may also comprise a mobile computer, including for example a tablet computer or a smart phone. The computer system of FIG. 15 may for example receive program instructions, whether from existing software products or from embodiments of the present invention, via a computer program product and/or a network link to an external site.

For purposes of explanation, specific nomenclature is set forth to provide a thorough understanding of the present invention. Description of specific applications and methods are provided only as examples. Various modifications to the embodiments will be readily apparent to those skilled in the art and the general principles defined herein may be applied to other embodiments and applications without departing from the spirit and scope of the invention. Thus the present invention is not intended to be limited to the embodiments shown, but is to be accorded the widest scope consistent with the principles and steps disclosed herein.

As used herein, the terms "a" or "an" shall mean one or more than one. The term "plurality" shall mean two or more than two. The term "another" is defined as a second or more. The terms "including" and/or "having" are open ended (e.g., comprising). Reference throughout this document to "one embodiment", "certain embodiments", "an embodiment" or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation. The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In accordance with the practices of persons skilled in the art of computer programming, embodiments are described with reference to operations that may be performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the embodiments may serve as the code segments directing a computing device to perform the necessary tasks. The non-transitory code segments may be stored in a processor readable medium or computer readable medium, which may include any medium that may store or transfer information. Examples of such media include an electronic circuit, a semiconductor memory device, a read-only memory (ROM), a flash memory or other non-volatile memory, a floppy diskette, a CD-ROM, an optical disk, a hard disk, a fiber optic medium, etc. User input may include any combination of a keyboard, mouse, touch screen, voice command input, etc. User input may similarly be used to direct a browser application executing on a user's computing device to one or more network resources, such as web pages, from which computing resources may be accessed.

While particular embodiments of the present invention have been described, it is to be understood that various different modifications within the scope and spirit of the invention will be apparent to ordinarily skilled artisans. The invention is limited only by the scope of the appended claims.

What is claimed is:

1. A single-instruction multiple-data (SIMD) multiplier-accumulator apparatus comprising:
    a multiplier block comprising two 16-bit by 32-bit multiplier circuits that together transform a number of input multipliers and a number of input multiplicands into a number of multiplication products; and
    an accumulator block that adds the multiplication products to a number of input addends and tangibly outputs a number of multiply-accumulate results, wherein sign extension for the multiply-accumulate results is performed: (i) under a first format for at least a first number of bits for the input multipliers and the input multiplicands and (ii) under a second format for at least a second number of bits for the input multipliers and the input multiplicands.

2. The apparatus of claim 1 wherein each multiplier circuit comprises an array of full adders that generates and sums partial products using carry-save addition.

3. The apparatus of claim 1, further comprising:
    an interface, wherein the interface receives an input two-bit data format control signal that designates a number of bits for the input multipliers and the input multiplicands, the number of bits selectively comprising one of eight, 16, 24, and 32.

4. The apparatus of claim 3 wherein the input two-bit data format control signal designates an overall number of multiplications performed by the multiplier circuits and the accumulator width for each multiplication product, the number of multiplications selectively comprising one of four eight-bit by eight-bit multiplications each with a 20-bit accumulator width, two 16-bit by 16-bit multiplications each with a 40-bit accumulator width, one 24-bit by 24-bit multiplication with an 80-bit accumulator width, and one 32-bit by 32-bit multiplication with an 80-bit accumulator width.

5. The apparatus of claim 1, further comprising:
    an interface, wherein the interface receives an input two-bit signed multiplication control signal that designates how the input multipliers and the input multiplicands are selectively signed.

6. The apparatus of claim 1, further comprising:
    an interface, wherein the interface receives an input negation control signal that designates whether the multiplication products are selectively negated.

7. The apparatus of claim 1, further comprising:
    an interface, wherein the interface receives an input Q-format control signal that designates whether the input addend, multiplier, and multiplicand values are selectively formatted in Q-format.

8. The apparatus of claim 1 wherein the apparatus outputs multiply-accumulate results at a rate of at least 1.1 GHz.

9. The apparatus of claim 1 wherein the accumulator block comprises (i) a 3:2 compressor and a 5:2 compressor, (ii) a carry propagate adder and a 2× carry propagate adder, and (iii) a three-input carry propagate adder, wherein the 3:2 compressor and the 5:2 compressor compress the multiplier products, the carry propagate adder and the 2× carry propagate adder combine the compressed results, and the three-input carry propagate adder sums the combined results.

10. The apparatus of claim 1 wherein, for 24-bit by 24-bit and 32-bit by 32-bit multiplications, a predetermined sign extension expression for the leading bits of an 80-bit multiply-accumulate result is evaluated before generating the leading bits of the 80-bit multiply-accumulate result.

11. A method for performing single-instruction multiple-data (SIMD) multiply-accumulate data processing operations with a SIMD multiplier-accumulator apparatus, comprising:
transforming a number of input multipliers and a number of input multiplicands into a number of multiplication products using a multiplier block comprising two 16-bit by 32-bit multiplier circuits together; and
adding the multiplication products to a number of input addends and tangibly outputting a number of multiply-accumulate results using an accumulator block, wherein sign extension for the multiply-accumulate results is performed: (i) under a first format for at least a first number of bits for the input multipliers and the input multiplicands and (ii) under a second format for at least a second number of bits for the input multipliers and the input multiplicands.

12. The method of claim 11 wherein the transforming in each multiplier circuit further comprises generating and summing partial products using an array of full adders with carry-save addition.

13. The method of claim 11 further comprising using an input two-bit data format control signal at an interface of the apparatus to designate a number of bits for the input multipliers and the input multiplicands, the number of bits selectively comprising one of eight, 16, 24, and 32.

14. The method of claim 13 further comprising using the input two-bit data format control signal to designate an overall number of multiplications performed by the multiplier circuits and the accumulator width for each multiplication product, the number of multiplications selectively comprising one of four eight-bit by eight-bit multiplications each with a 20-bit accumulator width, two 16-bit by 16-bit multiplications each with a 40-bit accumulator width, one 24-bit by 24-bit multiplication with an 80-bit accumulator width, and one 32-bit by 32-bit multiplication with an 80-bit accumulator width.

15. The method of claim 11 further comprising using an input two-bit signed multiplication control signal at an interface of the apparatus to designate how the input multipliers and the input multiplicands are selectively signed.

16. The method of claim 11 further comprising using an input negation control signal at an interface of the apparatus to designate whether the multiplication products are selectively negated.

17. The method of claim 11 further comprising using an input Q-format control signal at an interface of the apparatus to designate whether the input addend, multiplier, and multiplicand values are selectively formatted in Q-format.

18. The method of claim 11 wherein the adding further comprises compressing the multiplier products with a 3:2 compressor and a 5:2 compressor, combining the compressed results with a carry propagate adder and a 2× carry propagate adder, and summing the combined results with a three-input carry propagate adder.

19. The method of claim 11 further comprising, for 24-bit by 24-bit and 32-bit by 32-bit multiplications, evaluating a predetermined sign extension expression for the leading bits of an 80-bit multiply-accumulate result before generating the leading bits of the 80-bit multiply-accumulate result.

20. A non-transitory computer readable medium storing instructions that, when executed by a processor, perform a method for single-instruction multiple-data (SIMD) multiply-accumulate data processing operations comprising:
transforming a number of input multipliers and a number of input multiplicands into a number of multiplication products using a multiplier block comprising two 16-bit by 32-bit multiplier circuits together; and
adding the multiplication products to a number of input addends and tangibly outputting a number of multiply-accumulate results using an accumulator block, wherein sign extension for the multiply-accumulate results is performed: (i) under a first format for at least a first number of bits for the input multipliers and the input multiplicands and (ii) under a second format for at least a second number of bits for the input multipliers and the input multiplicands.

* * * * *